United States Patent
Steele et al.

(10) Patent No.: US 10,927,908 B2
(45) Date of Patent: Feb. 23, 2021

(54) HYBRID TORQUE TUBE

(71) Applicant: GOODRICH CORPORATION, Charlotte, NC (US)

(72) Inventors: Leslie Steele, Dayton, OH (US); Thomas P Filburn, Granby, CT (US); Michael A. Klecka, Coventry, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/865,635

(22) Filed: May 4, 2020

(65) Prior Publication Data

US 2020/0263747 A1 Aug. 20, 2020

Related U.S. Application Data (62) Division of application No. 15/887,754, filed on Feb. 2, 2018, now Pat. No. 10,677,300.

(51) Int. Cl.
*F16D 65/00* (2006.01)
*F16D 55/36* (2006.01)
(Continued)

(52) U.S. Cl.
CPC .......... *F16D 65/0056* (2013.01); *B33Y 70/00* (2014.12); *B33Y 80/00* (2014.12); *C22C 14/00* (2013.01); *F16D 55/36* (2013.01); *F16D 65/02* (2013.01); *B33Y 10/00* (2014.12); *B64C 25/42* (2013.01); *F16D 2055/0008* (2013.01); *F16D 2065/1364* (2013.01); *F16D 2065/1368* (2013.01); *F16D 2065/1388* (2013.01); *F16D 2065/1392* (2013.01); *F16D 2200/003* (2013.01); *F16D 2200/0008* (2013.01); *F16D 2200/0082* (2013.01); *F16D 2250/0007* (2013.01); *F16D 2250/0023* (2013.01);
(Continued)

(58) Field of Classification Search
CPC ............. F16D 55/36; F16D 2055/0058; F16D 65/0006; F16D 2065/1368; F16D 65/0056; F16D 65/02; B64C 25/42; B33Y 80/00; B33Y 70/00; C22C 14/00
See application file for complete search history.

(56) References Cited

U.S. PATENT DOCUMENTS

| 3,958,833 A | 5/1976 | Stanton |
| 4,084,857 A | 4/1978 | VanderVeen |

(Continued)

FOREIGN PATENT DOCUMENTS

| EP | 2940340 | 11/2015 |
| EP | 3184422 | 6/2017 |

OTHER PUBLICATIONS

European Patent Office, European Search Report dated Jul. 2, 2019 in Application No. 19154.

(Continued)

*Primary Examiner* — Xuan Lan Nguyen
(74) *Attorney, Agent, or Firm* — Snell & Wilmer L.L.P.

(57) ABSTRACT

A hybrid torque tube for a brake assembly may comprise a tube portion having a centerline axis, and a conical back-leg portion extending from the tube portion. A stator spline may be formed on a radially outward surface of the tube portion. A foot may be formed on a radially inward surface of the tube portion. The tube portion is formed using a first manufacturing process and at least one of the conical back-leg, stator spline, or foot is formed using additive manufacturing.

7 Claims, 6 Drawing Sheets

(51) Int. Cl.
- *B33Y 80/00* (2015.01)
- *B33Y 70/00* (2020.01)
- *C22C 14/00* (2006.01)
- *F16D 65/02* (2006.01)
- *B33Y 10/00* (2015.01)
- *B64C 25/42* (2006.01)
- *F16D 55/00* (2006.01)

(52) U.S. Cl.
CPC ............... *F16D 2250/0046* (2013.01); *F16D 2250/0076* (2013.01)

(56) References Cited

U.S. PATENT DOCUMENTS

| | | |
|---|---|---|
| 5,186,521 A | 2/1993 | Niespodziany et al. |
| 5,310,025 A | 5/1994 | Anderson |
| 6,003,954 A | 12/1999 | Everhard et al. |
| 8,950,557 B2 | 2/2015 | Houser |
| 9,458,891 B2 | 10/2016 | Julian |
| 9,670,975 B1 | 6/2017 | Rook |
| 9,759,278 B2 | 9/2017 | Rook |
| 9,784,134 B2 | 10/2017 | Eleftheriou |
| 2003/0111304 A1 | 10/2003 | Evrard |
| 2012/0325594 A1 | 12/2012 | Rook et al. |
| 2015/0308526 A1 | 10/2015 | Swank et al. |
| 2016/0279710 A1 | 9/2016 | Whittle et al. |
| 2017/0022614 A1 | 1/2017 | Herrmann |
| 2017/0174328 A1 | 6/2017 | Rook |
| 2017/0174330 A1 | 6/2017 | Rook |

OTHER PUBLICATIONS

USPTO; Restriction Requirement Office Action dated Jan. 10, 2019 in U.S. Appl. No. 15/887,754.
USPTO; Pre-Interview First Office Action dated Apr. 3, 2019 in U.S. Appl. No. 15/887,754.
USPTO; First Action interview Office Action dated Aug. 14, 2019 in U.S. Appl. No. 15/887,754.
USPTO; Final Office Action dated Nov. 21, 2019 in U.S. Appl. No. 15/887,754.
USPTO; Notice of Allowance dated Feb. 6, 2020 n U.S. Appl. No. 15/887,754.

HYBRID TORQUE TUBE

CROSS REFERENCE TO RELATED APPLICATIONS

This application is a divisional of, and claims priority to, U.S. Ser. No. 15/887,754 filed on Feb. 2, 2018 and entitled "HYBRID TORQUE TUBE," which is hereby incorporated by reference in its entirety for all purposes.

FIELD

The present disclosure relates to brake systems, and more specifically, to torque tubes for aircraft brake systems.

BACKGROUND

Aircraft typically have brakes on the wheels to slow the aircraft during aborted takeoffs, landings, and while taxiing. Aircraft brake systems generally employ a brake stack comprised of a series of friction disks, which may be forced into contact with one another to stop the aircraft. The brake systems may include a torque tube (also referred to as a torque plate). The torque tube is generally machined from a single piece of metal which tends to generate a large amount of material waste and which forms a solid metal torque tube with increased weight.

SUMMARY

In various embodiments, the present disclosure provides a method of making a hybrid torque tube for a brake assembly. The method may comprise forming a tube portion having a centerline axis using a first manufacturing process, forming and a conical back-leg extending from the tube portion in a radially outward angled orientation relative to the centerline axis, forming a stator spline on a radially outward surface of the tube portion, and forming a foot extending from a radially inward surface of the tube portion. At least one of the conical back-leg, the stator spline, or the foot may be formed using a second manufacturing process different from the first manufacturing process. The second manufacturing process may comprise an additive manufacturing technique.

In various embodiments, a portion of the stator spline may be hollow. In various embodiments, a cross-section of the stator spline may comprise a lattice structure. In various embodiments, forming the stator spline may comprise depositing a base material with a coating located over the base material.

In various embodiments, the method may further comprise forming the tube portion using a first metal alloy, and forming, at least, a portion of the conical back-leg using a second metal alloy different from the first metal alloy.

In various embodiments, the method may further comprise forming the tube portion using a first metal alloy, and forming the foot using a second metal alloy different from the first metal alloy. The second metal alloy may comprise a greater resistance to creep as compared to the first metal alloy.

Also disclosed herein, according to various embodiments, is a method of making a hybrid torque tube for a brake assembly comprising forming a tube portion having a centerline axis using a first manufacturing process, forming a conical back-leg extending from a first end of the tube portion, forming a flange at a second end of the tube portion opposite the first end of the tube portion, forming a foot extending from a radially inward surface of the tube portion, and forming a stator spline on the tube portion. At least one of the conical back-leg, the flange, the foot, or the stator spline may be formed using a second manufacturing process. The second manufacturing process may comprise an additive manufacturing technique.

In various embodiments, the first manufacturing process may comprise at least one of forging, extrusion, casting, machining, stamping, or subtractive manufacturing. In various embodiments, the flange, the foot, or the stator spline may be formed using the second manufacturing process, and the conical back-leg may be formed using at least one of forging, extrusion, casting, machining, stamping, subtractive manufacturing, welding, or swaging.

In various embodiments, forming the stator spline may comprise depositing a base material with a wear coating located over the base material. In various embodiments, a portion of the stator spline may be hollow.

In various embodiments, the tube portion may comprise a first material and the foot may comprise a second material different from the first material.

Also disclosed herein, according to various embodiments, is a hybrid torque tube for a brake assembly. The hybrid torque tube may comprise a tube portion having a centerline axis. The tube portion may comprise a first metal alloy. A conical back-leg may extend from the tube portion in a radially outward angled orientation relative to the centerline axis. A stator spline may be formed on a radially outward surface of the tube portion. A foot may be formed on a radially inward surface of the tube portion. At least one of the conical back-leg, the stator spline, or the foot may comprise a second metal alloy different from the first metal alloy.

In various embodiments, a portion of the stator spline is hollow. In various embodiments, a portion of the stator spline comprises a lattice structure. In various embodiments, an end of the stator spline proximate the conical back-leg may be tapered.

In various embodiments, the first metal alloy may comprise a first non-ferrous material, and the second metal alloy may comprise a second non-ferrous material different from the first non-ferrous material. The second non-ferrous material may have a greater resistance to creep as compared to the first non-ferrous material. In various embodiments, the first metal alloy may comprise, by weight, 6% aluminum, 4% vanadium, a maximum of 0.2% oxygen, a maximum of 0.25% iron, and at least 89% titanium. The second metal alloy may comprise, by weight, 6% aluminum, 2% tin, 4% zirconium, 2% molybdenum, and at least 85% titanium.

In various embodiments, the first metal alloy may comprise a first ferrous material, and the second metal alloy may comprise a second ferrous material different from the first ferrous material.

The foregoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Surface cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily be repeated herein for the sake of clarity.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer(s) to a direction inward, or generally, towards the reference component.

Figure 1:
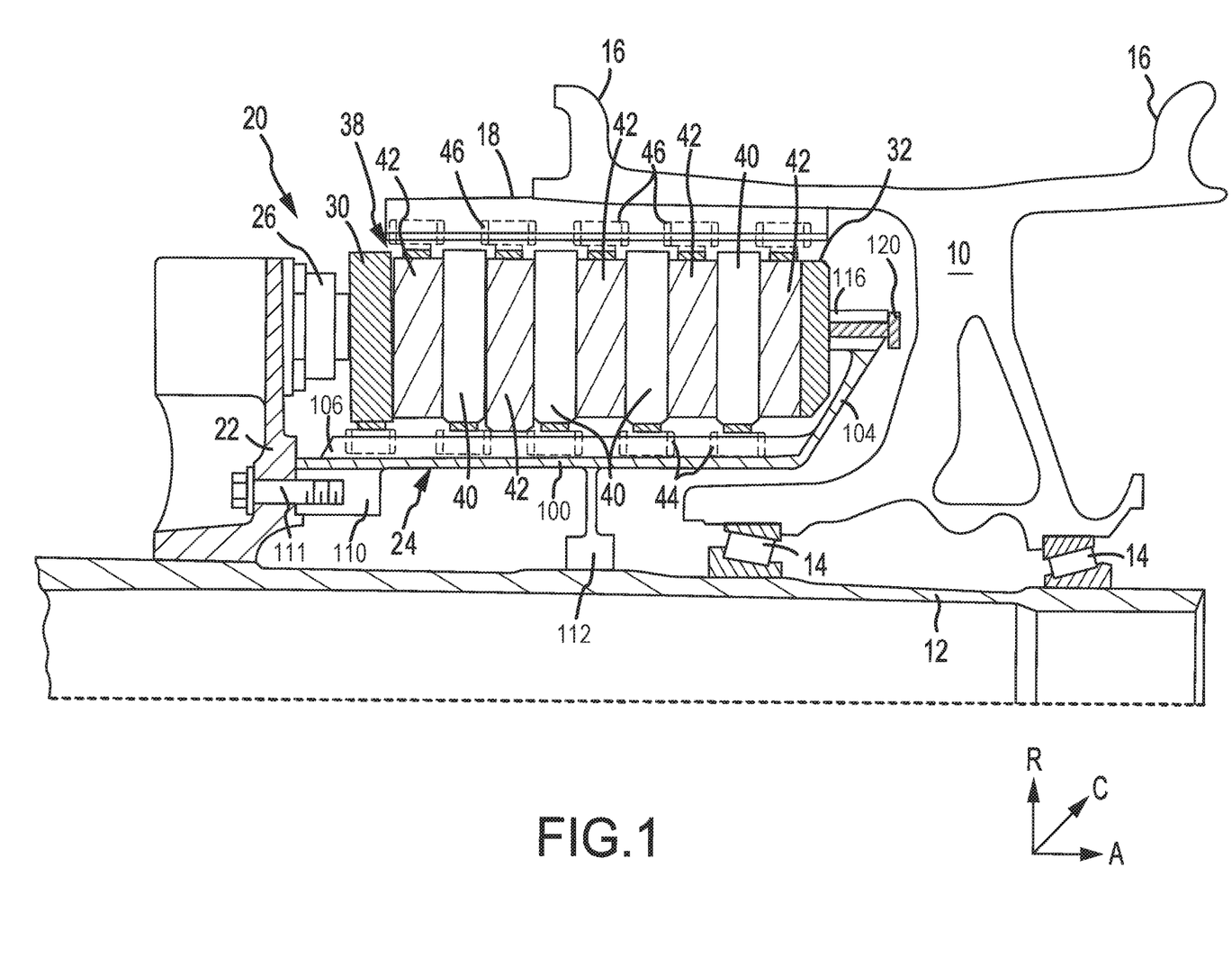
FIG. 1 illustrates a cross-sectional view of a brake assembly, in accordance with various embodiments.

With reference to FIG. 1, a multi-disk brake system 20 is illustrated, in accordance with various embodiments. An A-R-C axis has been included in the drawings to illustrate the axial (A), radial (R) and circumferential (C) directions. Multi-disk brake system 20 may include a wheel 10 supported for rotation around axle 12 by bearings 14. Wheel 10 includes rims 16 for supporting a tire, and a series of axially extending rotor splines 18 (one shown). Rotation of wheel 10 is modulated by multi-disk brake system 20. Multi-disk brake system 20 includes a piston housing 22, torque tube 24, a plurality of pistons 26 (one shown), pressure plate 30, end plate 32, and plurality of friction disks 38 located between pressure plate 30 and end plate 32.

The plurality of friction disks 38 includes at least one non-rotatable friction disk 40, also known as a stator, and at least one rotatable friction disk 42, also known as a rotor. Each of the friction disks 38 includes an attachment structure. In various embodiments, each of the four non-rotatable friction disks 40 includes a plurality of stator lugs 44 at circumferentially spaced positions around the non-rotatable friction disk 40 as an attachment structure. Similarly, each of the five rotatable friction disks 42 includes a plurality of rotor lugs 46 at circumferentially spaced positions around the rotatable friction disk 42 as an attachment structure. Pressure plate 30, end plate 32, and friction disks 38 are each annular structures and may be made at least partially from a carbon composite material.

Figure 2A:
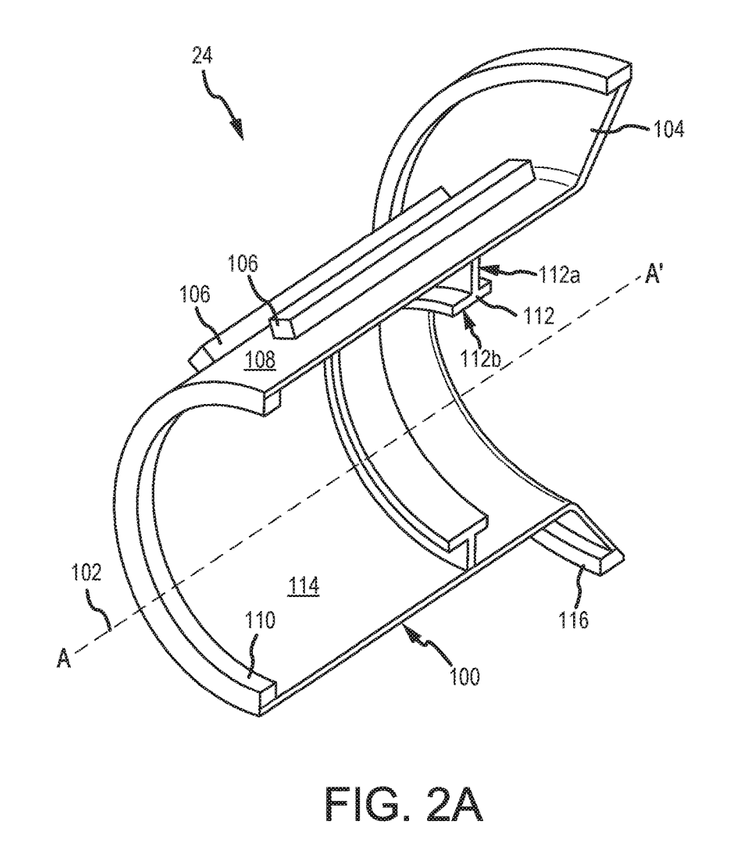
FIG. 2A illustrates a cutaway of a hybrid torque tube, in accordance with various embodiments.

With reference to FIG. 2A, torque tube 24 is an elongated annular structure that includes a cylindrical tube portion 100 having a centerline axis 102, a conical back-leg 104 (also referred to as a pressure flange web) extending from tube portion 100, and a series of axially extending stator splines 106 (also referred to as torque lugs) formed on a radially outward surface, or outer diameter, 108 of tube portion 100. The conical back-leg 104 extends radially outward from tube portion 100 and towards wheel 10 at an angled orientation relative to centerline axis 102. In various embodiments, conical back-leg 104 has a frustoconical shape. Torque tube 24 may further include a flange 110 (also referred to as a piston housing flange) and a foot 112 (also referred to as an inner support flange). Flange 110 may be formed at an end of tube portion 100 that is opposite conical back-leg 104. Flange 110 may extend radially inward from tube portion 100. Flange 110 may be coupled to piston housing 22, with momentary reference to FIG. 1, via a fastener 111. Fastener 111 may comprise a screw, bolt, rivet, pin, or other suitable securement mechanism.

Returning to FIG. 2A, foot 112 may be formed on a radially inward surface, or inner diameter, 114 of tube portion 100. Foot 112 may contact an axle 12, with momentary reference to FIG. 1. In various embodiments, a lip 116 may be formed on a radially outward end of conical back-leg 104. Lip 116 may extend axially from conical back-leg 104 such that lip 116 is parallel radially outward surface 108 of tube portion 100. In various embodiments, lip 116 may be oriented at angle of up to 90° relative to a plane parallel with radially outward surface 108 of tube portion 100.

As discussed in further detail below, torque tube 24 is hybrid torque tube. As used herein, a "hybrid torque tube" refers to a torque tube having at least one component (e.g., stator splines 106, flange 110, foot 112, lip 116, etc.) formed using an additive manufacturing technique, for example, wire arc additive manufacturing or electron beam additive manufacturing, and at least one component (e.g., tube portion 100) formed using a non-additive manufacturing technique, for example, forging, extrusion, machining, casting, stamping, or subtractive manufacturing.

Returning to FIG. 1, piston housing 22 is mounted to axle 12. Flange 110 of torque tube 24 is bolted or otherwise coupled to piston housing 22 with conical back-leg 104 of torque tube 24 proximate an axial center of wheel 10. End plate 32 is connected or mounted to lip 116 of torque tube 24. In various embodiments, lip 116 may define one or more holes extending through lip 116 and configured to receive a fastener 120. Fastener 120 may comprise a bolt, pin, anchor, lug, or other suitable securement mechanism. Stator splines 106 support non-rotatable friction disks 40. Stator splines 106 may also support pressure plate 30 such that pressure plate 30 is also non-rotatable. Non-rotatable friction disks 40 engage stator splines 106 via gaps formed between stator lugs 44. Similarly, rotatable friction disks 42 engage rotor splines 18 via gaps formed between rotor lugs 46. Rotatable friction disks 42 are rotatable by virtue of their engagement with rotor splines 18 of wheel 10.

Rotatable friction disks 42 are arranged with end plate 32 on an end proximate wheel 10, with pressure plate 30 on an end distal wheel 10 and proximate pistons 26, and with non-rotatable friction disks 40 interleaved so that rotatable friction disks 42 are adjacent to non-rotatable friction components (e.g., interleaved rotors and stators). Pistons 26 are connected to piston housing 22 at circumferentially spaced positions around piston housing 22. Pistons 26 face axially toward wheel 10 and contact a side of pressure plate 30 opposite rotatable friction disks 42. Pistons 26 may be powered electrically, hydraulically, or pneumatically.

In various embodiments, in response to actuation of pistons 26, a force is exerted on the rotatable friction disks 42 and the non-rotatable friction disks 40 towards conical back-leg 104. The rotatable friction disks 42 and the non-rotatable friction disks 40 may thus be pressed together between pressure plate 30 and end plate 32.

Under various braking conditions, a large amount of torque may be applied to friction disks 38 and an extreme amount of heat may be generated. In this regard, various components and/or areas of torque tube 24 may experience increased mechanical stresses at elevated temperatures, which may cause these components and/or areas to "creep." Stated differently, the mechanical stresses and increased heat generated during various braking events may lead to deformation of one or more components of torque tube 24. The present disclosure, according to various embodiments, provides a hybrid torque tube which is both light weight and resistant to creep. More specifically, and according to various embodiments, a hybrid torque tube may be manufactured using both additive and non-additive manufacturing techniques whereby the components and/or areas of the torque tube that are more susceptible to creep may be formed using materials that have an increased creep resistance, while other components and/or areas of the torque tube that are less susceptible to creep may be formed using other less creep resistant materials. Minimizing and/or reducing the amount of material having increased creep resistance tends to reduce manufacturing costs. Additionally, employing additive manufacturing techniques to form various components of the torque tube tends to decrease material waste and allow for geometries that may not otherwise be possible with other manufacturing processes.

Referring to FIG. 2A, tube portion 100 of torque tube 24 may be formed using a first manufacturing process which employs non-additive manufacturing techniques. For example, tube portion 100 may be formed by forging, extrusion, machining, casting, stamping, subtractive manufacturing, and/or other suitable non-additive manufacturing techniques. Tube portion 100 may comprise a non-ferrous material, for example, titanium or titanium alloy. In various embodiments, tube portion 100 may comprise a titanium alloy conforming to the unified numbering system standard (UNS) R56400, also referred to as Grade 5 titanium, which may also be referred to as Ti-6Al-4V (Ti64), and which is comprised of, by weight, 6% aluminum, 4% vanadium, a maximum of 0.2% Oxygen, a maximum of 0.25% iron, and at least 89% titanium. In various embodiments, tube portion 100 may comprise a ferrous material, for example, a chromium-molybdenum steel, a nickel-chromium-molybdenum steel, or a nickel-chromium-molybdenum-vanadium steel.

Stator splines 106 may be formed on radially outward surface 108 of tube portion 100 using a second manufacturing process that employs an additive manufacturing technique. For example, tube portion 100 may be formed by forging, extrusion, casting, and/or machining, and stator splines 106 may be formed by wire arc additive manufacturing, electron beam additive manufacturing, or other suitable additive manufacturing technique. Forming stator splines 106 using additive manufacturing allows the geometries and materials of stator splines 106 to be uniquely tailored.

Figure 3A:
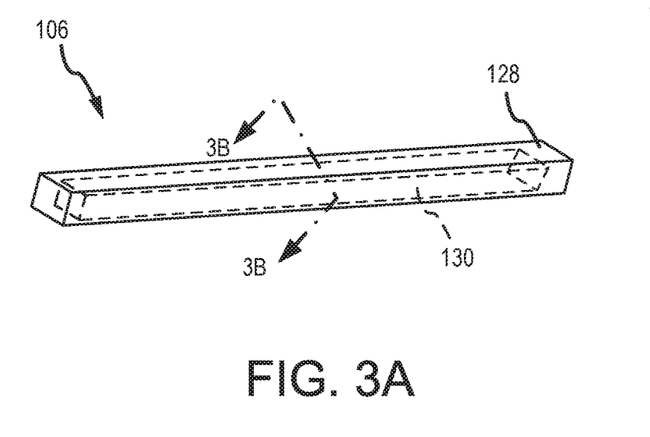
FIGS. 3A and 3B illustrate, respectively, a perspective view and a cross-sectional view of a hollow stator spline, in accordance with various embodiments.
Figure 3B:
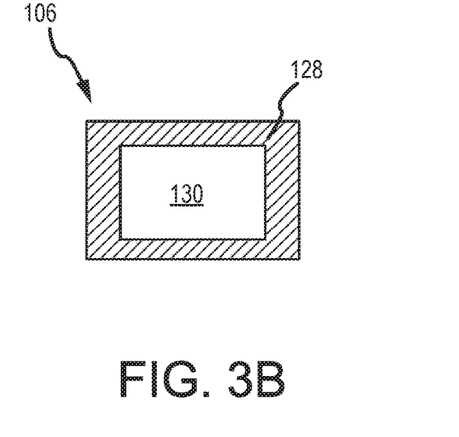

FIG. 3A illustrates a perspective view of a stator spline 106, in accordance with various embodiments. FIG. 3B illustrates a cross-sectional view of stator spline 106 taken along the line 3B-3B in FIG. 3A and generally parallel to the R-axis in FIG. 1. In various embodiments, additive manufacturing may be employed to form stator spline 106 having a hollow portion. In various embodiments, stator spline 106 may be formed by depositing a material 128, for example, a metal or metal alloy, on radially outward surface 108 of torque tube 24 using, for example, wire arc or electron beam additive manufacturing. Stator spline 106 comprises an internal portion or cavity 130 that is devoid of material 128. Stated differently, material 128 defines an internal cavity 130 within stator spline 106. While FIGS. 3A and 3B illustrate internal cavity 130 having a square or rectangular cross-sectional geometry, it should be understood that internal cavity 130 may be formed having a cross-sectional geometry that is circular, oval, triangular, polygonal, or any other shape.

Figure 3C:
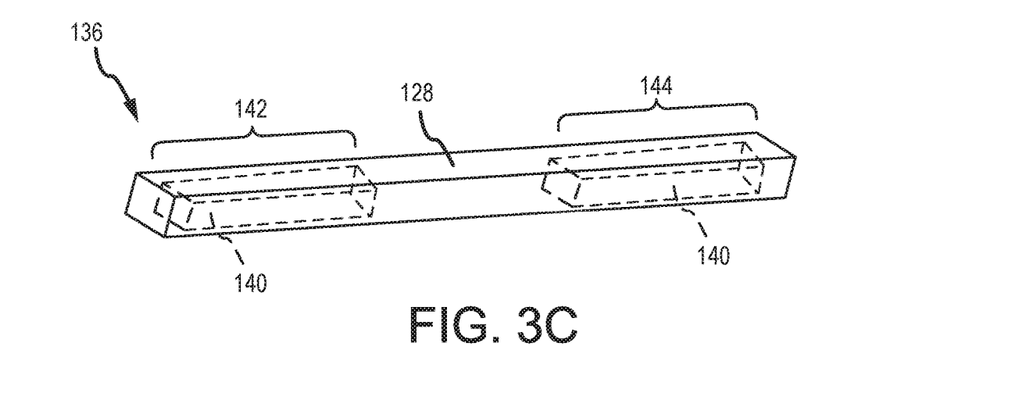
FIG. 3C illustrates a perspective view of a stator spline having multiple hollow portions, in accordance with various embodiments.

With combined reference to FIG. 2A and FIG. 3C, in various embodiments, torque tube 24 may be formed having one or more stator splines 136 with multiple hollow portions. Stator spline(s) 136 may be formed on tube portion 100 using additive manufacturing. In various embodiments, a material 138, for example, a metal or metal alloy, is deposited on radially outward surface 108 of tube portion 100 using wire arc or electron beam additive manufacturing to form stator spline 136. Stator spline 136 comprises a plurality of internal portions or cavities 140 that are devoid of material 138. Stated differently, material 138 defines a plurality of internal cavities 140 within stator spline 136. While FIG. 3C illustrates internal cavities 140 having a square or rectangular cross-sectional geometry, it should be understood that internal cavities 140 may be formed having a cross-sectional geometry that is circular, oval, triangular, polygonal, or any other shape. In various embodiments, a first hollow portion 142 of stator spline 136 may comprise a cross-sectional geometry that is different from the cross-sectional geometry of a second hollow portion 144 of stator spline 136. The stator splines on tube portion 100 may comprise any mix of hollow splines and non-hollow splines in any type of arrangement. The stator splines may be arranged to allow directional heat flow to leave the wheel or may provide alternative type of cooling paths, as heat dissipation from the hollow stator splines will differ from heat dissipation from solid stator splines.

Figure 3D:
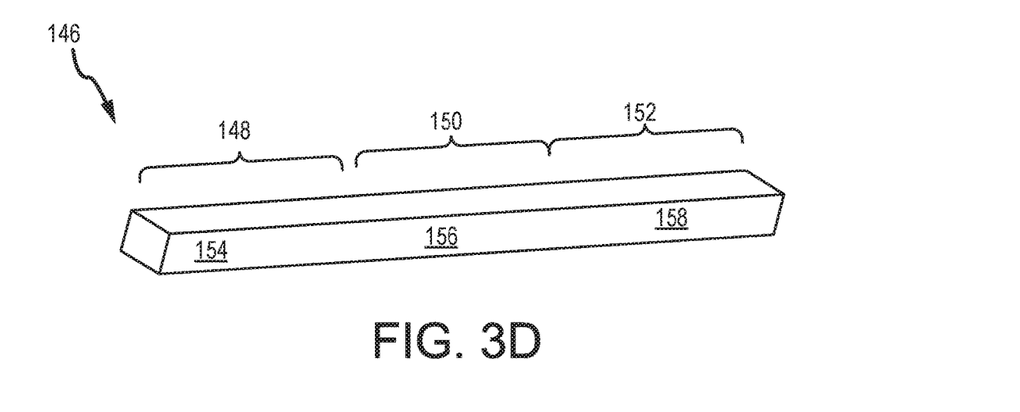
FIG. 3D illustrates a perspective view of a stator spline having portions comprised of different materials, in accordance with various embodiments.

With combined reference to FIG. 2A and FIG. 3D, in various embodiments, torque tube 24 may be formed having one or more stator splines 146 with portions of varying material. Stator spline(s) 146 may be formed on tube portion 100 using additive manufacturing. In various embodiments, a first portion 148 of stator spline 146 may be formed by depositing a metal or metal alloy 154 on radially outward surface 108 using wire arc or electron beam additive manufacturing. A second portion 150 of stator spline 146 may be formed by depositing a metal or metal alloy 156, which is different from the metal or metal alloy 154, on radially outward surface 108 using wire arc or electron beam additive manufacturing. In various embodiments, first portion 148 may comprise a material having a greater heat resistance (i.e., higher melting point), a greater tensile strength, and/or a greater creep resistance as compared to the material of second portion 150. In various embodiments, first portion 148 may comprise a material having a different thermal conductivity as compared to the material of second portion 150 to provide variable heat conduction during braking. A third portion 152 of stator spline 146 may be formed by depositing a metal or metal alloy 158, which is different from metal or metal alloy 156, on radially outward surface 108 using wire arc or electron beam additive manufacturing. Metal or metal alloy 158 may be the same or different from metal or metal alloy 154. In various embodiment, the transition between first portion 148 and second portion 150 and/or the transition between second portion 150 and third portion 152 may be a gradient transition. While stator spline 146 is shown having axially adjacent portions 148, 150, and 152 comprised of varying materials, it should be understood that stator spline 146 may be formed having radially adjacent, circumferentially adjacent, and/or diagonally adjacent portions of varying materials.

Figure 3E:
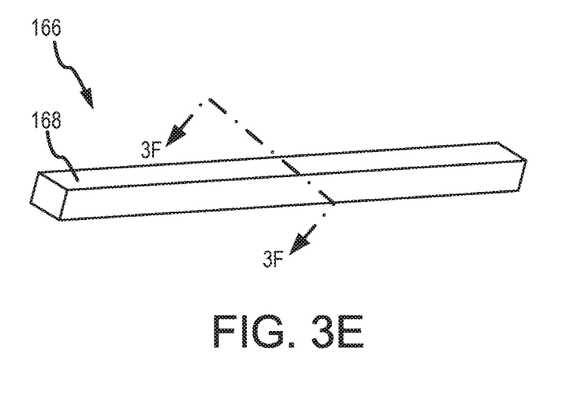
FIGS. 3E and 3F illustrate, respectively, a perspective view and a cross-sectional view of a stator spline comprising a lattice structure, in accordance with various embodiments.
Figure 3F:
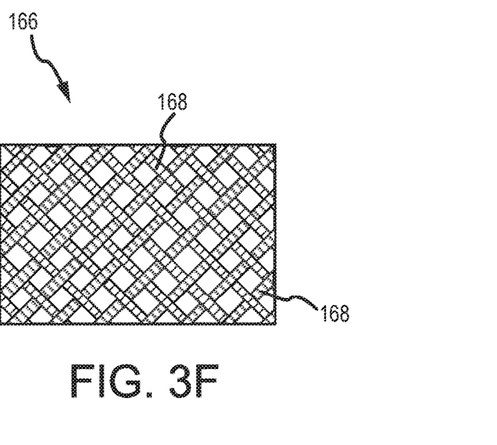

FIG. 3E illustrates a perspective view of a stator spline 166 having a lattice structure, in accordance with various embodiments. FIG. 3F illustrates a cross-sectional view of stator spline 166 taken along the line 3F-3F in FIG. 3E and generally parallel to the R-axis shown in FIG. 1. With combined reference to FIG. 2A and FIGS. 3E and 3F, in various embodiments, torque tube 24 may be formed having one or more stator splines 166 comprised of a lattice structure. Stator spline(s) 166 may be formed on tube portion 100 using additive manufacturing. In various embodiments, a material 168, for example, a metal or metal alloy, may be deposited on radially outward surface 108 of tube portion 100 using wire arc or electron beam additive manufacturing to form the lattice structure of stator spline 166. While stator spline 166 is shown having a lattice structure with square or diamond shape openings defined by material 168, it should be understood that stator spline 166 may have a lattice structure of any geometry, for example, in various embodiments, material 168 may define honeycomb-shaped openings. While FIG. 3F illustrates a cross-sectional view of stator spline 166 taken along a radial plane (i.e., along a plane parallel to the R-axis in FIG. 1), in various embodiments, a cross-section of stator spline 166 taken along an axial plane (i.e., a plane parallel to the A-axis in FIG. 1) may comprise a lattice structure.

Figure 3G:
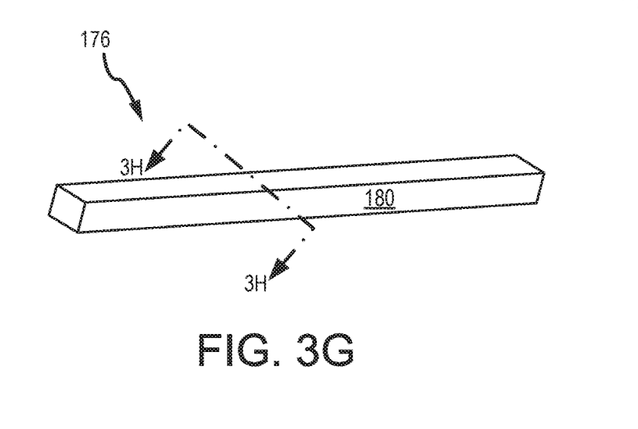
FIGS. 3G and 3H illustrate, respectively, a perspective view and a cross-sectional view of a stator spline having a wear coating, in accordance with various embodiments.
Figure 3H:
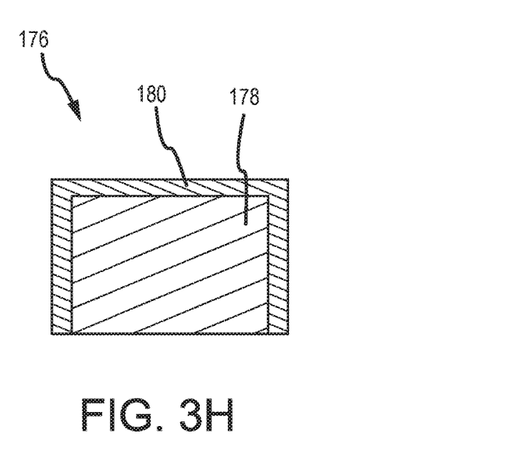

FIG. 3G illustrates a perspective view of a stator spline 176 having a wear coating, in accordance with various embodiments. FIG. 3H illustrates a cross-sectional view of stator spline 176 taken along the line 3H-3H in FIG. 3G and generally parallel to the R-axis shown in FIG. 1. With combined reference to FIG. 2A and FIGS. 3G and 3H, in various embodiments, torque tube 24 may be formed having one or more stator spline(s) 176 including a coating 180. Stator spline 176 may comprise a base material 178, for example, a titanium-based alloy, and a coating 180, for example, a nickel-based superalloy, located over the base material 178. Stator spline(s) 176 may be formed on tube portion 100 using additive manufacturing. In this regard, base material 178 and coating 180 located over base material 178 may be deposited using wire arc or electron beam additive manufacturing. In various embodiments, coating 180 may be located over some portions of base material 178 and other portions of base material 178 may be devoid of coating 180. For example, the portions having coating 180 may correspond to portions of stator spline 176 that engage stator lugs 44, with momentary reference to FIG. 1. Coating 180 may comprise a wear resistance coating, a thermal resistance coating, a corrosion resistance coating, or a combination of two or more type coatings.

Returning to FIG. 2A, in various embodiments, foot 112 may be formed on radially inward surface 114 of tube portion 100 using additive manufacturing. Forming foot 112 using additive manufacturing may allow, at least, a portion of foot 112 to be formed using a material having a greater resistance to creep as compared to other components of torque tube 24. For example, in various embodiments, tube portion 100 may be formed using Ti64 and foot 112 may be formed using a titanium alloy conforming to UNS R54620, which may be referred to as Ti-6Al-2Sn-4Zr-2Mo (Ti6242), and which is comprised of, by weight, 6% aluminum, 2% tin, 4% zirconium, 2% molybdenum, and at least 85% titanium. In various embodiments, foot 112 may be formed using a titanium alloy conforming to UNS R54620, which may be referred to as Ti-6Al-2Sn-4Zr-2Mo-0.08Si (Ti6242S), and which is comprised of, by weight, 6% aluminum, 2% tin, 4% zirconium, 2% molybdenum, 0.08% silicon, and at least 85% titanium, or using any other near-alpha, alpha, or alpha+beta titanium alloy.

In various embodiments, one or more components of torque tube 24 may comprise a nickel based superalloy. For example, in various embodiments, one or more components of torque tube 24 may be formed using a nickel based superalloy conforming to UNS N07718, which is comprised of, by weight, 50%-55% nickel (plus cobalt), 17%-21% chromium, 2.8%-3.3% molybdenum, 4.75%-5.5% niobium (plus tantalum), 0.65%-1.15% titanium, 0.2%-0.8% aluminum, and a max of 1% cobalt.

In various embodiments, tube portion 100 may be formed using a ferrous material (e.g., a chromium-molybdenum steel or a nickel-chromium-molybdenum steel) and foot 112 may be formed using a ferrous material this different from the ferrous material of tube portion 100. In various embodiments, the ferrous material of foot 112 may comprise a greater resistance to creep, as compared to the ferrous material of tube portion 100.

Forming foot 112 using additive manufacturing also allows different portions of foot 112 to be formed using different materials. For example, a radially extending portion 112a of foot 112 may comprise a material having a greater heat resistance (i.e., higher melting point), tensile strength, and/or creep resistance as compared to the material used to form an axially extending portion 112b of foot 112. With combined reference to FIG. 1 and FIG. 2A, in various embodiments, foot 112 may be formed using a material that provides thermal insulation, for example, a material having a decreased thermal conductivity as compared to a material of tube portion 100, in order to reduce conduction of heat to axle 12. In various embodiments, foot 112 may comprise a lattice structure configured to reduce conduction of heat to axle 12. Configuring foot 112 to better insulate axle 12 from heat generated by friction disks 38 may allow other types of insulators located between foot 112 and axle to be removed.

In various embodiments, flange 110 and/or lip 116 may also be formed using additive manufacturing and may each comprise a material that is different from one or more of the other components of torque tube 24. In various embodiments, foot 112 may be coupled to radially inward surface 114 using friction stir welding.

In various embodiments, both tube portion 100 and conical back-leg 104 may be formed using non-additive manufacturing techniques. For example, tube portion 100 and conical back-leg 104 may be formed by forging, extrusion, casting, machining, stamping, subtractive manufacturing, or by welding conical back-leg 104 to tube portion 100. In various embodiments, conical back-leg 104 may be formed by swaging or flaring an end of tube portion 100.

Figure 2B:
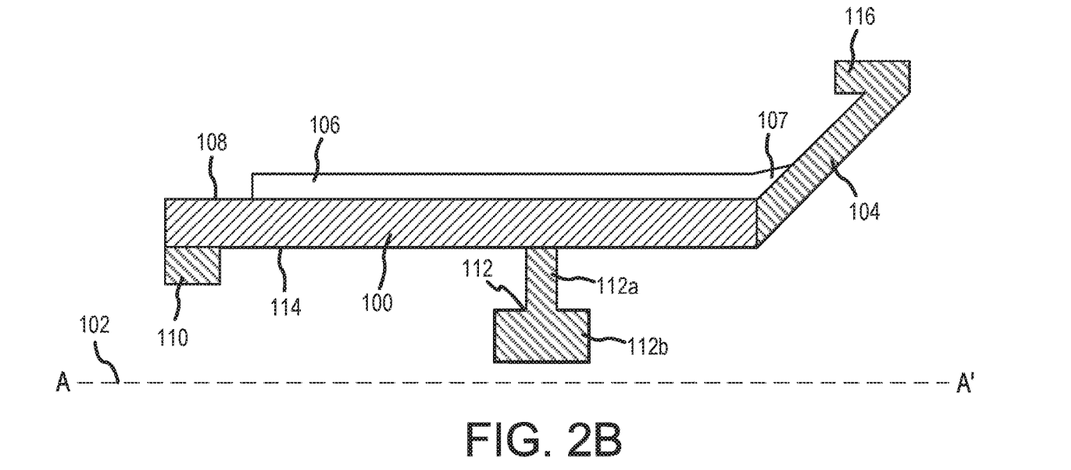
FIG. 2B illustrates a cross-sectional view of a portion of a hybrid torque tube having a conical back-leg formed by additive manufacturing, in accordance with various embodiments.

With reference to FIG. 2B, in various embodiments, tube portion 100 may be formed using a first manufacturing process comprised of non-additive manufacturing techniques and conical back-leg 104 may be formed on tube portion 100 using a second manufacturing process that employs an additive manufacturing technique. For example, tube portion 100 may be formed by forging, extrusion, casting, and/or machining, and conical back-leg 104 may be formed by wire arc or electron beam additive manufacturing. Forming conical back-leg 104 using additive manufacturing may allow some or all of conical back-leg 104 to be formed using a material that is different from the material used to form one or more of the other components (e.g., tube portion 100 and/or stator splines 106) of torque tube 24. For example, in various embodiments, tube portion 100 may be formed using Ti64 and conical back-leg 104 may be formed using Ti6242. Forming conical back-leg 104 using additive manufacturing also allows different portions of conical back-leg 104 to be formed using different materials. For example, a first portion of conical back-leg 104 may comprise a material having a greater heat resistance (i.e., higher melting point), tensile strength, and/or creep resistance as compared to the material of a second portion of conical back-leg 104. In various embodiments, an end 107 of stator splines 106 may be tapered. End 107 may extend radially outward, along conical back-leg 104, at an angled orientation relative to centerline axis 102. In various embodiments, the angle of end 107 relative to centerline axis 102 is equal to the angle of conical back-leg 104 relative to centerline axis 102.

Figure 4A:
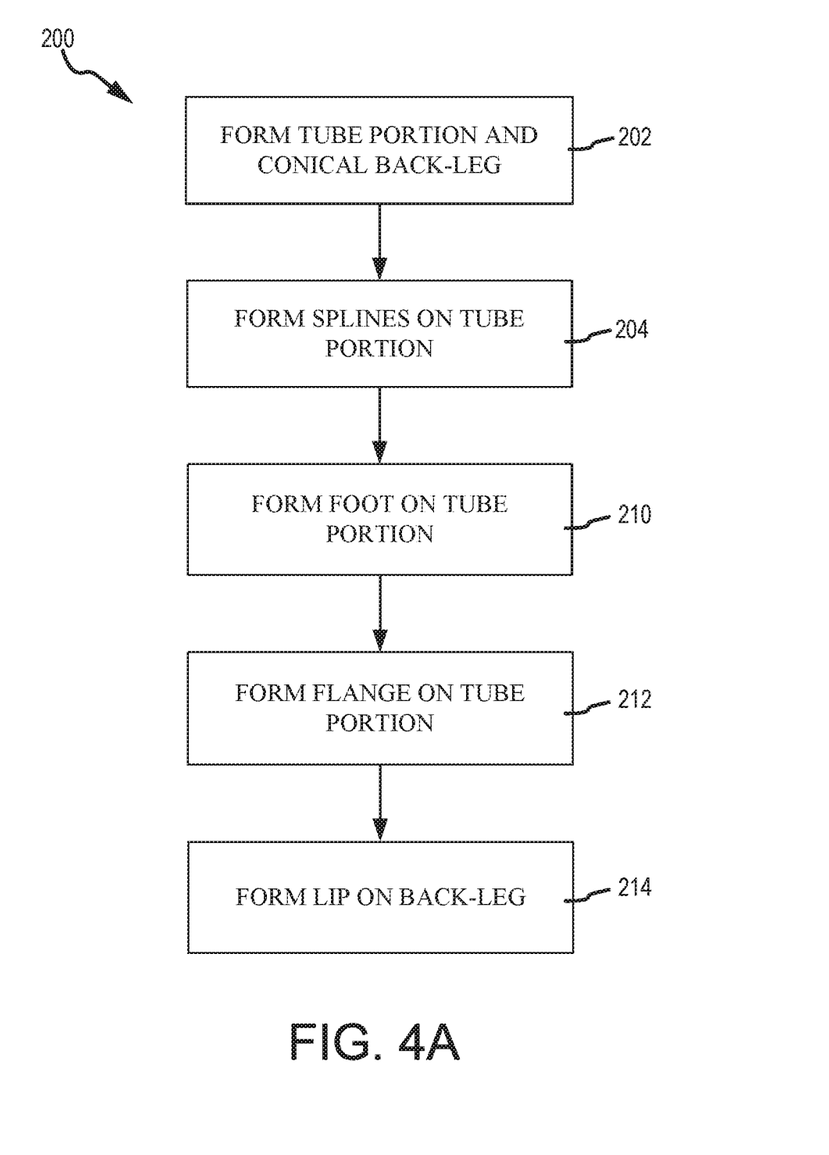
FIGS. 4A and 4B illustrate a method of making a hybrid torque tube, in accordance with various embodiments.

FIG. 4A illustrates a method 200 of making a hybrid torque tube for a brake assembly, in accordance with various embodiments. Method 200 may comprise forming a tube portion having a centerline axis and a conical back-leg extending radially outward from the tube portion (step 202) and forming stator splines on a radially outward surface of the tube portion (step 204). In various embodiments, step 202 includes forming, at least, the tube portion using a non-additive manufacturing technique, for example, forging, extrusion, casting, machining, and step 204 includes forming the stator spline using an additive manufacturing technique, for example, wire arc or electron beam additive manufacturing. In various embodiments, a portion of at least one of the stator splines may be hollow. In various embodiments, at least one of the stator splines may comprise a lattice structure. In various embodiments, step 204 may comprise forming at least one of the stator splines by depositing a base material and a coating over the base material.

Figure 4B:
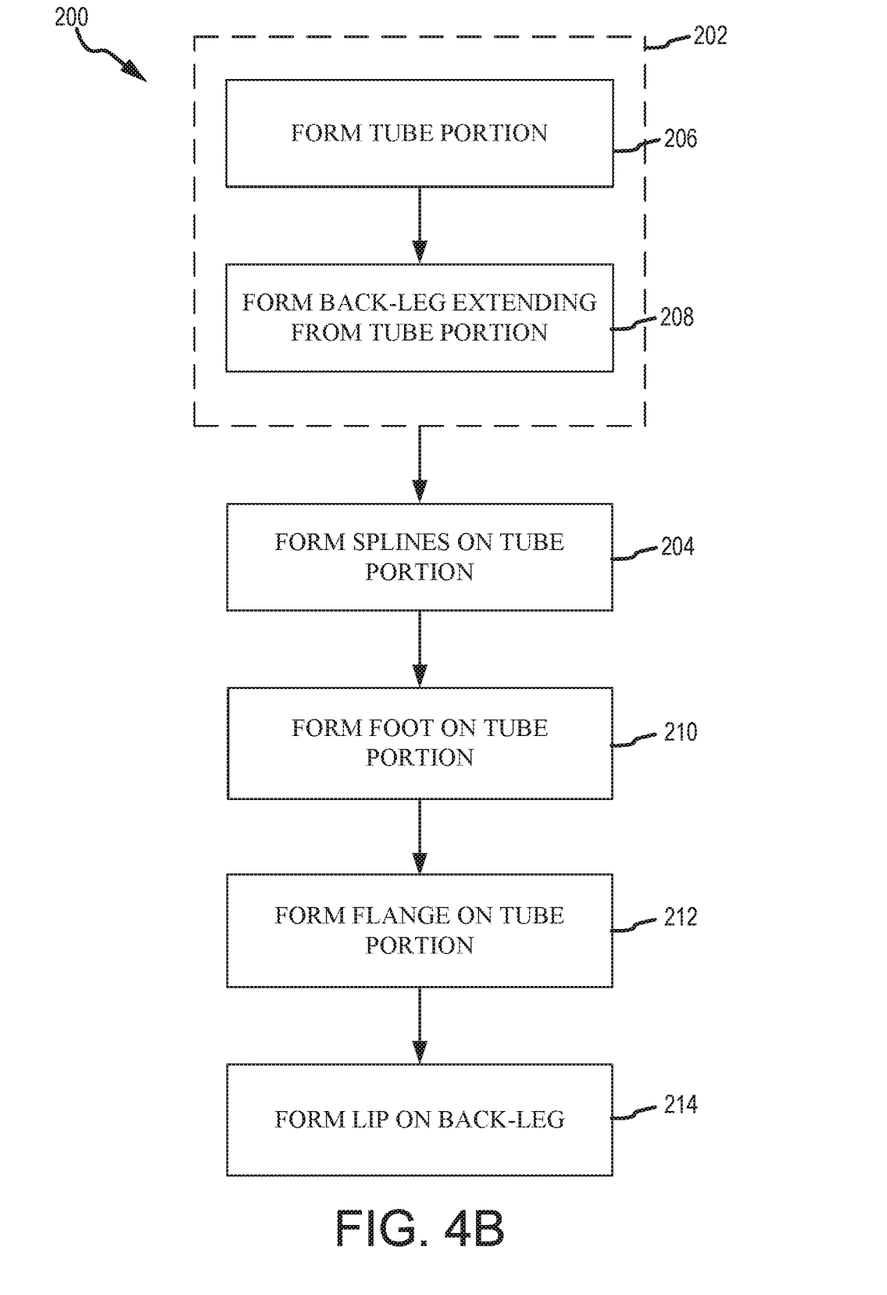

With reference to FIG. 4B, in various embodiments, step 202 may comprise forming a tube portion using a first manufacturing process comprising a non-additive manufacturing technique, for example, forging, extrusion, casting, machining, (step 206), and forming a conical back-leg extending from the tube portion using additive manufacturing, for example, using wire arc or electron beam additive manufacturing (step 208). In various embodiments, step 206 may comprise forming the tube portion using a first material (e.g., a first metal alloy), and step 208 may comprise forming the conical back-leg using a second material (e.g., a second metal alloy) different from the first material.

With combined reference to FIGS. 4A and 4B, in various embodiments, method 200 may further comprise forming a foot extending from a radially inward surface of the tube portion using additive manufacturing (step 210). In various embodiments, step 202 may comprise forming the tube portion using a first material (e.g., a first metal alloy), and step 210 may comprise forming the foot using a second material (e.g., a second metal alloy) different from the first material. In various embodiments, the second material may comprise a greater resistance to creep as compared to the first material.

In various embodiments, method 200 may further include forming a flange at an end of the tube portion opposite the conical back-leg (step 212). Step 212 may include forming the flange using additive manufacturing. Method 200 may further include forming a lip extending from a radially outward end of the conical back-leg (step 214). Step 214 may include forming the lip using additive manufacturing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid torque tube for a brake assembly, the hybrid torque tube comprising:
    a tube portion having a centerline axis, the tube portion comprising a first metal alloy;
    a conical back-leg extending from the tube portion in a radially outward angled orientation relative to the centerline axis;
    a stator spline formed on a radially outward surface of the tube portion; and
    a foot formed on a radially inward surface of the tube portion, wherein at least one of the conical back-leg, the stator spline, or the foot comprises a second metal alloy different from the first metal alloy.

2. The hybrid torque tube of claim 1, wherein a portion of the stator spline is hollow.

3. The hybrid torque tube of claim 1, wherein a portion of the stator spline comprises a lattice structure.

4. The hybrid torque tube of claim 1, wherein the first metal alloy comprises a first non-ferrous material, and wherein the second metal alloy comprises a second non-ferrous material different from the first non-ferrous material, the second non-ferrous material having a greater resistance to creep as compared to the first non-ferrous material.

5. The hybrid torque tube of claim 4, wherein the first metal alloy comprises, by weight, 6% aluminum, 4% vanadium, a maximum of 0.2% oxygen, a maximum of 0.25% iron, and at least 89% titanium, and wherein the second metal alloy comprises, by weight, 6% aluminum, 2% tin, 4% zirconium, 2% molybdenum, and at least 85% titanium.

6. The hybrid torque tube of claim 1, wherein the first metal alloy comprises a first ferrous material, and wherein the second metal alloy comprises a second ferrous material different from the first ferrous material.

7. The hybrid torque tube of claim 1, wherein an end of the stator spline proximate the conical back-leg is tapered.

* * * * *